Patented Apr. 13, 1926.

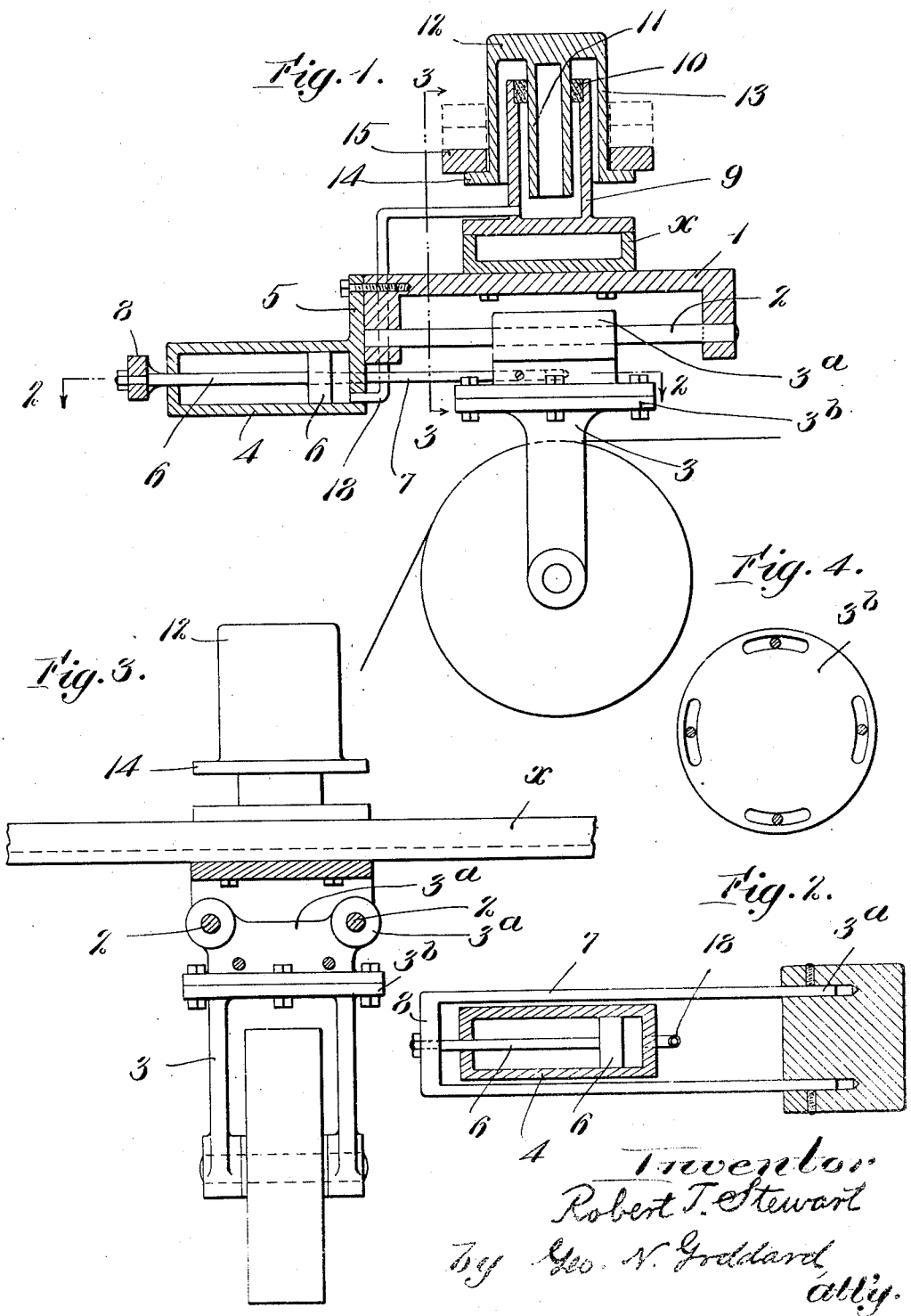

1,581,091

UNITED STATES PATENT OFFICE.

ROBERT T. STEWART, OF BOSTON, MASSACHUSETTS, ASSIGNOR TO AMERICAN TOOL & MACHINE COMPANY, OF BOSTON, MASSACHUSETTS, A CORPORATION OF MASSACHUSETTS.

IDLER PULLEY FOR BELT TENSION.

Application filed June 1, 1922. Serial No. 565,034.

*To all whom it may concern:*

Be it known that I, ROBERT T. STEWART, a citizen of the United States, and resident of Boston, in the county of Suffolk and State of Massachusetts, have invented certain new and useful Improvements in Idler Pulleys for Belt Tension, of which the following is a specification.

This invention relates to tensioning means for transmission belts and is intended to provide a simple, reliable and smooth-working device for this purpose which shall be capable of adjustment to secure the degree of pressure or tension desired against the belt by the idler pulley forming one of its component elements.

Heretofore it has been proposed to use a weighted lever for exerting tension or pressure upon the idler pulley engaging the belt in order to keep the belt taut, but as such tension pulleys are subjected to sudden shocks or strains which tend to throw the pulley away from the belt, the pressure or tension exerted on the belt at different times will vary considerably while the pulley has a jerky motion which is injurious to the belt and does not conduce to smooth running.

The present invention is based upon the transmission of a working pressure through a liquid body so as to avoid the jerky and uneven movement heretofore experienced with tensioning idler pulleys and secure a uniform smooth running constant pressure of the pulley against the transmission belt.

In the accompanying drawings I have illustrated one of the forms embodying the principles of this invention, in which:

Figure 1 represents a side elevation chiefly in cross section showing a complete arrangement illustrating the invention.

Figure 2 is a detail plan view illustrating the cross-head connection between the piston and the pulley hanger on the plane 2—2 of Figure 1.

Figure 3 is a sectional elevation on plane 3—3 of Figure 1 showing the slidable and adjustable suspension of the pulley.

Figure 4 is a plan view illustrating the angular adjustment of the pulley hanger on its supporting head member.

In the practice of the invention according to the form illustrated in the drawings, I provide a suitable support 1, with parallel tracks 2, 2, for slidingly supporting the pulley hanger 3, which as shown in the drawings is preferably made with its upper track engaging member 3$^a$ separated from the lower portion 3, the two sections being adjustably clamped together to permit angular adjustment by means of bolts 3$^b$ passing through opposed flanges.

Mounted in line with the sliding movement of the pulley is a fluid pressure cylinder 4, which in this case is bolted to the support 1, by means of a supporting flange 5. Inside the cylinder is a close-fitting piston 6, whose piston rod projects through the outer end of the piston. The end portion of the piston rod which projects outside of the cylinder is operatively connected to the slidable pulley hanger by any suitable connecting means. In the present case I have shown a cross-head member comprising parallel longitudinal arms 7, with a cross-connecting arm or head 8, the inner ends of said arms being anchored or suitably secured in or to the sliding head or hanger 3 which carries the pulley.

At the opposite end of the piston is arranged a fluid supply pipe 18, which is supplied with liquid from a containing reservoir 9, in which the liquid is maintained under pressure by any suitable manner.

The particular form of pressure device shown herein comprises an upright cylinder 9, provided with suitable packing 10 at its upper end to fit snugly around a ram or piston head 11 which in this case is preferably made hollow for a purpose presently to be described. The head or upper end 12, of the piston 11, is in this case designed to carry the weight which determines the pressure that shall be exerted upon the liquid column, and for conveniently carrying such weight securely the head is provided with a downward external extension 13, having an outwardly turned flange 14 at its bottom to support a series of annular weights 15 of which any desired number may be placed on the head to exert the desired pressure upon the liquid.

The liquid pressure device is shown mounted on the horizontal flange rim $x$ to which the pulley-supporting track 1, is secured but it will be obvious that the liquid condenser may be made of any desired size and located in any convenient position either to supply an individual tension pulley or as many of them as may be convenient.

It will be seen that with the arrangement shown the tubular or hollow piston head 11 in the pressure generating device forms an air pocket or cushion for absorbing the shock transmitted through incompressible liquid. This gives added smoothness to the operation of the device and it will be found in practice that a transmission belt used in service where it is subjected to sudden strains or shock will be held very smoothly and steadily without sudden rebound which is a common fault with weight or spring-actuated idlers.

While in the drawings the device is shown with the hanger suspended from an overhead supporting track, it will be understood that the hanger will function equally in whatever direction the hanger is arranged, and even if it should be inverted since, as is well known, it may be necessary in different locations to arrange the hanger in all sorts of positions. It will also be seen that by use of the fastening set screws shown in Figure 2 the cross head frame or piston-connecting member 7 may be detachably secured to the pulley hanger.

What I claim is:

1. A tensioning device for transmission belts embracing in its construction, a movable idler pulley mounted to press against a transmission belt, a liquid actuated piston having connection with said pulley to press it yieldingly against the belt, a liquid pressure reservoir and pressure generating means arranged to exert a predetermined pressure upon the liquid therein and to provide an air cushion for absorbing shocks transmitted to the liquid medium, substantially as described.

2. A tensioning device for transmission belts embracing in its construction, a movable idler pulley located to press against a transmission belt, a liquid containing pressure reservoir, and means actuated by the liquid pressure to yieldingly press the pulley against the belt, and means arranged to form an air pocket in communication with the liquid body to cushion shocks transmitted through said liquid, substantially as described.

3. A tensioning device for transmission belts embracing in its construction, a movable idler pulley mounted to engage a transmission belt a liquid cylinder and piston one of which has operative connection with said pulley to yieldingly exert pressure against the belt, a pressure-generating liquid reservoir in communication with said cylinder, a pressure-producing head weighted to maintain a predetermined pressure upon the liquid in said reservoir, said head being provided with an air pocket to form an elastic cushion against the liquid, substantially as described.

4. A belt tensioning idler pulley construction embracing a slidable track-engaging member, a pulley-carrying hanger having detachable and angular adjustment connection with said track-engaging member to permit setting the pulley at different angles to said sliding movement, a tensioning weight operating by a liquid pressed piston to keep the pulley pressed against the belt in its various angular adjustments, and an air cushioning chamber arranged to absorb shocks transmitted to the liquid pressure transmitting medium, substantially as described.

In witness whereof, I have subscribed the above specification.

ROBERT T. STEWART.